United States Patent
Agrawal et al.

(10) Patent No.: US 12,538,018 B2
(45) Date of Patent: Jan. 27, 2026

(54) CAPTURING IMAGES USING PREFERRED CAMERA SETTINGS IN AN ELECTRONIC DEVICE

(71) Applicant: MOTOROLA MOBILITY LLC, Wilmington, DE (US)

(72) Inventors: Amit Kumar Agrawal, Bangalore (IN); Renuka Prasad Herur Rajashekaraiah, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 138 days.

(21) Appl. No.: 18/349,153

(22) Filed: Jul. 9, 2023

(65) Prior Publication Data

US 2025/0016442 A1 Jan. 9, 2025

(51) Int. Cl.
| | |
|---|---|
| *H04N 23/667* | (2023.01) |
| *H04N 23/611* | (2023.01) |
| *H04N 23/62* | (2023.01) |
| *H04N 23/63* | (2023.01) |
| *H04N 23/661* | (2023.01) |
| *H04N 23/69* | (2023.01) |
| *H04N 23/90* | (2023.01) |

(52) U.S. Cl.
CPC ......... *H04N 23/667* (2023.01); *H04N 23/611* (2023.01); *H04N 23/62* (2023.01); *H04N 23/631* (2023.01); *H04N 23/661* (2023.01); *H04N 23/69* (2023.01); *H04N 23/90* (2023.01)

(58) Field of Classification Search
CPC .... H04N 23/667; H04N 23/611; H04N 23/62; H04N 23/631; H04N 23/632; H04N 23/661; H04N 23/69; H04N 23/90; H04N 23/63; H04N 23/633
See application file for complete search history.

(56) References Cited

U.S. PATENT DOCUMENTS

| | | | |
|---|---|---|---|
| 2018/0069968 A1* | 3/2018 | Kusaka | H04N 1/00106 |
| 2019/0114060 A1* | 4/2019 | Resudek | G06F 18/22 |
| 2019/0174055 A1* | 6/2019 | Srivastava | H04N 23/62 |
| 2020/0412864 A1* | 12/2020 | Al Majid | G06F 3/0488 |
| 2022/0084374 A1* | 3/2022 | Dour | G06F 1/1686 |
| 2022/0318026 A1* | 10/2022 | Gupta | G06F 21/74 |
| 2024/0406538 A1* | 12/2024 | Desserrey | H04N 23/62 |
| 2024/0422283 A1* | 12/2024 | Agrawal | H04N 5/272 |

* cited by examiner

*Primary Examiner* — Kelly L Jerabek
(74) *Attorney, Agent, or Firm* — Isidore PLLC

(57) ABSTRACT

An electronic device, a method, and a computer program product for presenting a user-selectable option of at least one preferred camera setting of a primary user of the electronic device for a secondary user to apply while capturing images using a camera of the electronic device. The method includes, in response to activation, via the secondary user, of a first camera of the electronic device to an image capturing mode, presenting on a display, a first graphical user interface comprising the user-selectable option corresponding to at least one preferred camera setting for the secondary user to apply while capturing images using the first camera. In response to the secondary user selecting the user-selectable option to apply the at least one preferred camera setting, the processor triggers the first camera to apply the preferred camera settings and to capture an image using the preferred camera settings.

20 Claims, 11 Drawing Sheets

CAPTURING IMAGES USING PREFERRED CAMERA SETTINGS IN AN ELECTRONIC DEVICE

BACKGROUND

1. Technical Field

The present disclosure generally relates to electronic devices with cameras and in particular to improving the capturing of images by a user of an electronic device with a camera.

2. Description of the Related Art

Electronic devices, such as cell phones, tablets, and laptops, are widely used for communication and data transmission. These electronic devices typically include one or more cameras that are used for taking photos and videos. Many conventional electronic devices have multiple front and rear cameras. The rear cameras can have lenses that are optimized for various focal angles and distances. For example, one rear camera can have a wide angle lens, another rear camera can have a telephoto lens, and an additional rear camera can have a macro lens. It is common for an electronic device user to want their photo taken by another user who may not be familiar with the operation of the electronic device's camera. When the camera of the electronic device is operated by another user, the resulting photos are often of poor quality. For example, the other user may take photos that are not properly aligned or not centered on a subject of interest.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
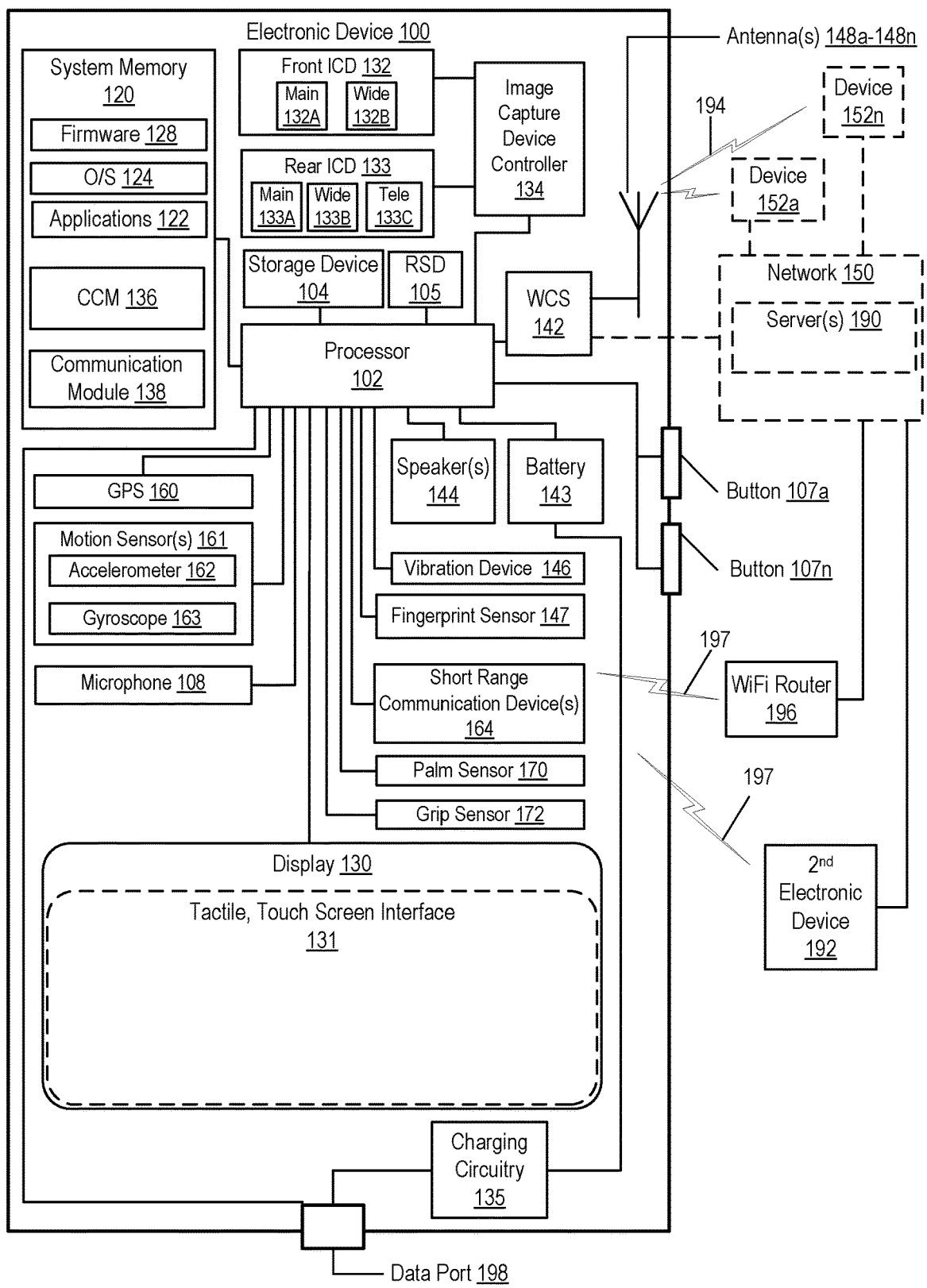
FIG. 1 depicts an example electronic device within which various aspects of the disclosure can be implemented, according to one or more embodiments.

According to one aspect of the disclosure, the illustrative embodiments provide an electronic device, a method, and a computer program product for presenting a user-selectable option corresponding to at least one preferred camera setting for a secondary user to select to apply while capturing images using a camera of the electronic device. In a first embodiment, an electronic device includes a first camera, a display, and a memory having stored thereon a camera control module (CCM) for controlling the first camera via one of a plurality of selectable image capturing modes. The electronic device further includes at least one processor that is communicatively coupled to the first camera, the display, and to the memory. The at least one processor executes program code of the CCM, which enables the at least one processor of the electronic device to, in response to activation of the first camera to a first image capturing mode, present, on the display, a first graphical user interface (GUI) comprising at least one user-selectable option corresponding to at least one preferred camera setting for the secondary user to select to apply while capturing images using the first camera.

According to another embodiment, the method includes in response to activation, via a processor, of a first camera of an electronic device to a first image capturing mode, presenting on a display, a first graphical user interface (GUI) comprising at least one user-selectable option corresponding to at least one preferred camera setting for a secondary user to select to apply while capturing images using the first camera.

According to an additional embodiment, a computer program product includes a computer readable storage device having stored thereon program code that, when executed by at least one processor of an electronic device having a first camera, and a display, the program code enables the electronic device to complete the functionality of one or more of the above described method.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example electronic device 100 within which various aspects of the disclosure can be implemented, according to one or more embodiments. Examples of such electronic devices include, but are not limited to, mobile devices, a notebook computer, a mobile phone, a digital camera, a smart watch, a tablet computer and a communication device, etc. It is appreciated that electronic device 100 can be other types of devices that include both at least one front camera and/or rear camera. Electronic device 100 includes processor 102, which is communicatively coupled to storage device 104, system memory 120, input devices, (introduced below), output devices, such as display 130, and image capture device (ICD) controller 134. Processor 102 can include processor resources such as a central processing unit (CPU) that support computing, classifying, processing and transmitting of data and information. Processor 102 can further include graphic processing units (GPU) and digital signal processors (DSP) that also support computing, classifying, processing and transmitting of data and information.

According to one or more embodiments, ICD controller 134 performs or supports functions such as, but not limited to, operating one or more cameras, adjusting camera settings and characteristics (shutter speed, f/stop, ISO exposure, zoom control, etc.) of the cameras, etc. ICD controller 134 can perform these functions in response to commands received from processor 102, which is executing camera control module (CCM) 136. In one or more embodiments, the functionality of ICD controller 134 is incorporated within processor 102, eliminating the need for a separate ICD controller. For simplicity in describing the features presented herein, the various camera control functions performed by the ICD controller 134 are described as being provided generally by processor 102.

System memory 120 may be a combination of volatile and non-volatile memory, such as random access memory (RAM) and read-only memory (ROM). System memory 120 can store program code or similar data associated with firmware 128, an operating system 124, applications 122, camera control module (CCM) 136, and communication module 138. CCM 136 includes program code that is executed by processor 102 to enable electronic device 100 to present a graphical user interface (GUI) comprising at least one user-selectable option corresponding to at least one preferred camera setting for a secondary user to select to apply while capturing images using a camera of electronic device 100. The secondary user is anyone who is not the primary user of the electronic device and who have not established specific settings for taking pictures or videos using the cameras of the electronic device. Communication module 138 includes program code that is executed by processor 102 to enable electronic device 100 to communicate with other external devices and systems.

Although depicted as being separate from applications 122, CCM 136 and communication module 138 may be each implemented as an application. Processor 102 loads and executes program code stored in system memory 120. Examples of program code that may be loaded and executed by processor 102 include program code associated with applications 122 and program code associated with CCM 136 and communication module 138.

In one or more embodiments, electronic device includes removable storage device (RSD) 105, which is inserted into an RSD interface (not shown) that is communicatively coupled via system interlink to processor 102. In one or more embodiments, RSD 105 is a non-transitory computer program product or computer readable storage device. RSD 105 may have a version of CCM 136 stored thereon, in addition to other program code. Processor 102 can access RSD 105 to provision electronic device 100 with program code that, when executed by processor 102, the program code causes or configures electronic device 100 to provide the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control electronic device 100 by touching features presented within/below the display screen. Tactile, touch screen interface 131 can be utilized as an input device.

Throughout the disclosure, the term image capturing device is utilized interchangeably to be synonymous with and/or refer to any one of front or rear cameras 132, 133. Front cameras (or image capture device (ICD)) 132 are communicatively coupled to ICD controller 134, which is communicatively coupled to processor 102. ICD controller 134 supports the processing of signals from front cameras 132. Front cameras 132 can each capture images that are within the respective field of view (FOV) of image capture device 132. Electronic device 100 includes several front cameras 132. First front camera 132A is a main camera that captures a standard angle FOV. Second front camera 132B is wide angle camera. While two front cameras 132A-132B are shown, electronic device 100 can have more than two front cameras.

Electronic device 100 further includes several rear cameras 133. Main rear camera 133A is a main camera that captures a standard or regular angle FOV. Wide angle rear camera 133B is a wide angle camera that captures a wide angle FOV. Telephoto rear camera 133C is a telephoto camera that captures a telephoto FOV (zoom or magnified). While three rear cameras are shown, electronic device 100 can have less than three rear cameras, such as having two rear cameras or can have more than three rear cameras.

Each front camera 132A and 132B and each rear camera 133A, 133B and 133C is communicatively coupled to ICD controller 134, which is communicatively coupled to processor 102. ICD controller 134 supports the processing of image data from front cameras 132A and 132B and rear cameras 133A, 133B and 133C. Front cameras 132A and 132B can be collectively referred to as front cameras 132, and rear cameras 133A, 133B and 133C can be collectively referred to as rear cameras 133, for simplicity.

Electronic device 100 can further include data port 198, charging circuitry 135, and battery 143. Electronic device 100 further includes microphone 108, one or more output devices such as speakers 144, and one or more input buttons 107a-n. Input buttons 107a-n may provide controls for volume, power, and image capture devices 132, 133. Microphone 108 can also be referred to as audio input device 108. Microphone 108 and input buttons 107a-n can also be referred to generally as input devices.

Electronic device 100 further includes wireless communication subsystem (WCS) 142, which is coupled to antennas 148a-148n. In one or more embodiments, WCS 142 can include a communication module with one or more baseband processors or digital signal processors, one or more modems, and a radio frequency front end having one or more transmitters and one or more receivers. Wireless communication subsystem (WCS) 142 and antennas 148a-148n allow electronic device 100 to communicate wirelessly with wireless network 150 via transmissions of communication signals 194 to and from network communication devices 152a-152n, such as base stations or cellular nodes, of wireless network 150. In one embodiment, communication network devices 152a-152n contain electronic communication equipment to allow communication with electronic device 100.

Wireless network 150 further allows electronic device 100 to wirelessly communicate with second electronic devices 192, which can be similarly connected to wireless network 150 via one of network communication devices 152a-152n. Wireless network 150 is communicatively coupled to wireless fidelity (WiFi) router 196. Electronic device 100 can also communicate wirelessly with wireless network 150 via communication signals 197 transmitted by short range communication device(s) 164 to and from WiFi router 196, which is communicatively connected to network 150. In one or more embodiment, wireless network 150 can include one or more servers 190 that support exchange of wireless data and video and other communication between electronic device 100 and second electronic device 192.

Electronic device 100 further includes short range communication device(s) 164. Short range communication device 164 is a low powered transceiver that can wirelessly communicate with other devices. Short range communication device(s) 164 can include one or more of a variety of devices, such as a near field communication (NFC) device, a Bluetooth device, and/or a wireless fidelity (Wi-Fi) device. Short range communication device(s) 164 can wirelessly communicate with WiFi router 196 via communication signals 197. Short range communication device(s) 164 can also wirelessly communicate with second electronic device 192 via communication signals 197. In one embodiment, electronic device 100 can receive internet or Wi-Fi based calls via short range communication device(s) 164. In one embodiment, electronic device 100 can communicate with WiFi router 196 wirelessly via short range communication device(s) 164. In an embodiment, WCS 142, antennas 148a-148n and short-range communication device(s) 164 collectively provide communication interface(s) of electronic device 100. These communication interfaces enable electronic device 100 to communicatively connect to at least one second electronic device 192 via at least one network.

Electronic device 100 further includes vibration device 146, fingerprint sensor 147, palm sensor 170, global positioning system (GPS) device 160, and motion sensor(s) 161. Vibration device 146 can cause electronic device 100 to vibrate or shake when activated. Vibration device 146 can be activated during an incoming call or message in order to provide an alert or notification to a user of electronic device 100. According to one aspect of the disclosure, display 130, speakers 144, and vibration device 146 can generally and collectively be referred to as output devices.

Fingerprint sensor 147 can be used to provide biometric data to identify or authenticate a user using the finger of a user. In one embodiment, output from fingerprint sensor 147 can be used to identify a primary/frequent user or a secondary/non-frequent user of electronic device 100. Palm sensor 170 can be used to provide biometric data to identify or authenticate a user using the palm of a user. In one embodiment, output from palm sensor 170 can be used to identify a primary/frequent user or a secondary/non-frequent user of electronic device 100.

GPS device 160 can provide time data and location data about the physical location of electronic device 100 using geospatial input received from GPS satellites.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100.

Electronic device 100 further includes grip sensor 172. Grip sensor 172 detects and measures pressures applied by a user grasping electronic device 100. Grip sensor 172 measures pressures for human hand and finger gripping of electronic device 100. In one embodiment, output from grip sensor 172 can be used to identify a primary/frequent user or a secondary/non-frequent user of electronic device 100. Within the description of the various embodiments, the term secondary user refers to anyone who is not the primary user of the electronic device and who have not established specific settings for taking pictures or videos using the cameras of the electronic device.

In the description of each of the following figures, reference is also made to specific components illustrated within the preceding figure(s). Similar components are presented with the same reference number.

Figure 2:
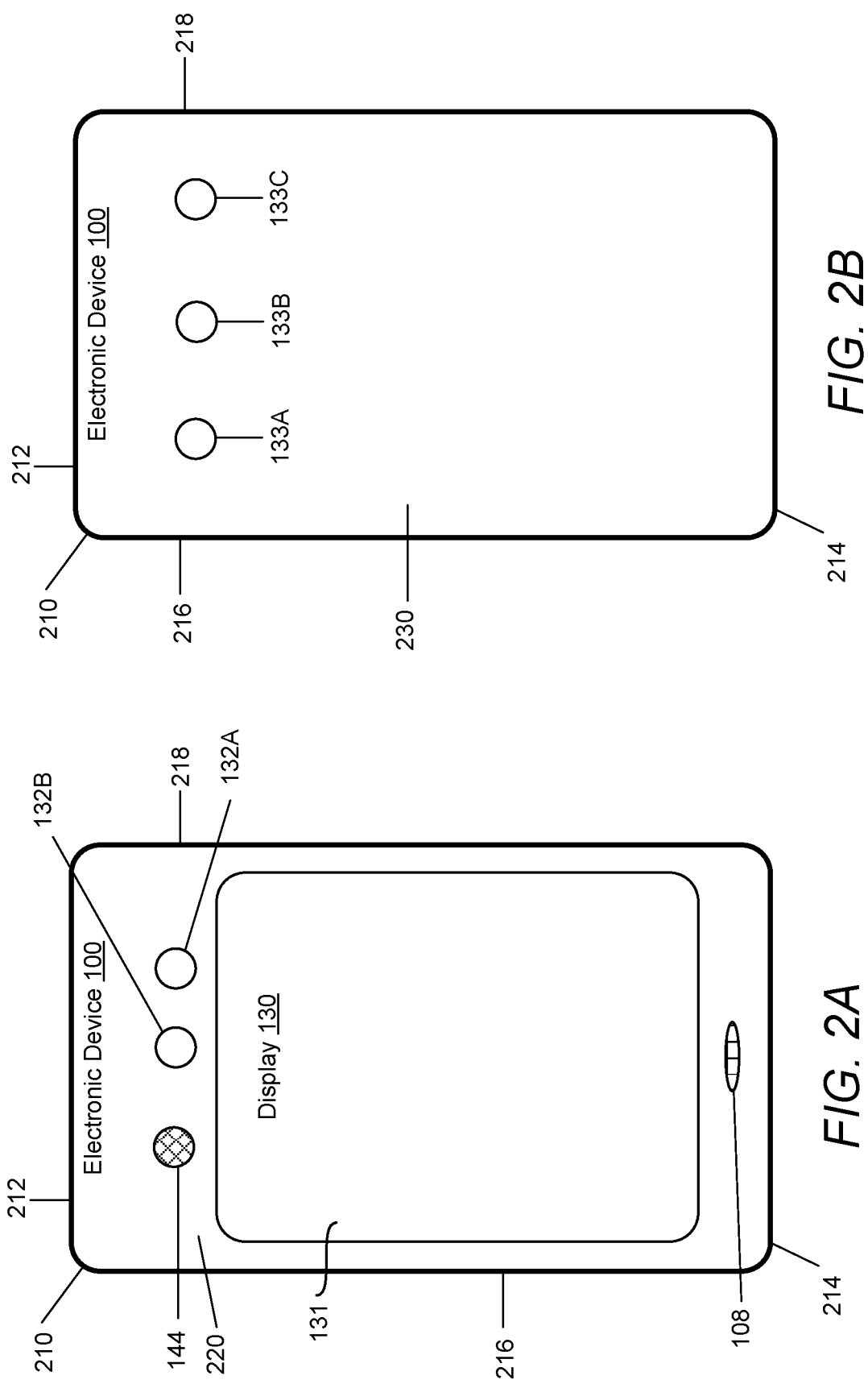
FIG. 2A is an example illustration of the front of an electronic device with multiple front cameras, according to one or more embodiments.
FIG. 2B is an example illustration of the rear of an electronic device with multiple rear cameras, according to one or more embodiments.

Turning to FIG. 2A, additional details of the front surface of electronic device 100 are shown. Electronic device 100 includes a housing 210 that contains the components of electronic device 100. Housing 210 includes a top 212, bottom 214, and opposed sides 216 and 218. Housing 210 further includes a front surface 220. Microphone 108, display 130, front cameras 132A, 132B and speaker 144 are disposed or located on/at front surface 220.

With additional reference to FIG. 2B, additional details of the rear surface of electronic device 100 are shown. Housing 210 further includes a rear surface 230. Various components of electronic device 100 are disposed or located on/at rear surface 230, including rear facing cameras 133. Rear main camera 133A, rear wide angle camera 133B, and rear telephoto camera 133C are illustrated disposed or located on rear surface 230. Each of the multiple rear facing cameras can have different image capturing characteristics. For example, rear facing telephoto camera 133C can include an optical zoom lens that is optimized for capturing images of distant objects.

Figure 3:
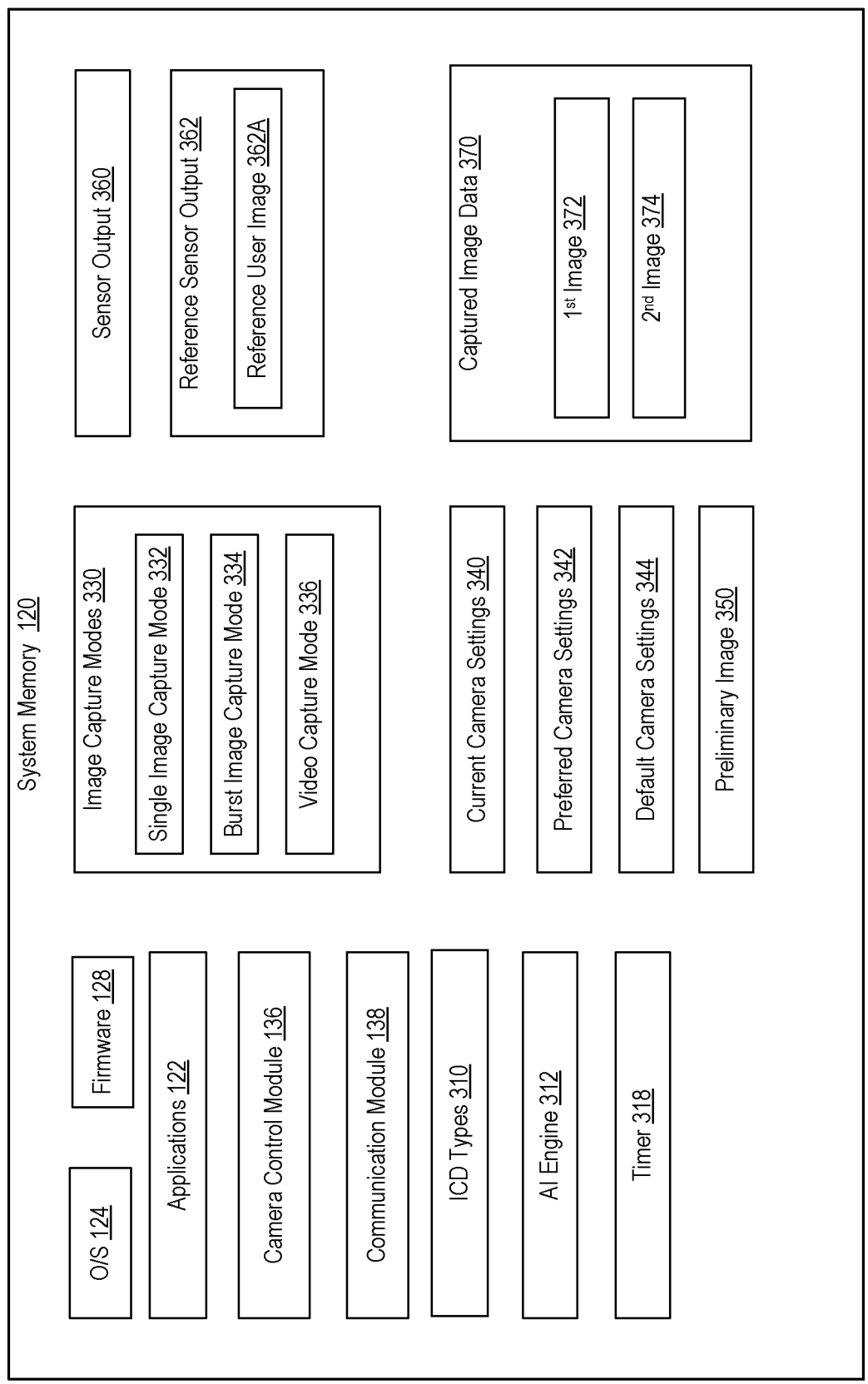
FIG. 3 is a block diagram of example contents of the system memory of the example electronic device of FIG. 1, according to one or more embodiments.

Referring to FIG. 3, there is shown one embodiment of example contents of system memory 120 of electronic device 100. System memory 120 includes data, software, and/or firmware modules, including applications 122, operating system 124, firmware 128, CCM 136, and communication module 138.

CCM 136 includes program code that is executed by processor 102 to enable electronic device 100 to perform the various features of the present disclosure. In one or more embodiments, CCM 136 enables electronic device 100 to control at least one camera and to present a graphical user interface (GUI) comprising at least one user-selectable option corresponding to at least one preferred camera setting for a secondary user to select to apply while capturing images using the camera. In one or more embodiments, execution of CCM 136 by processor 102 enables/configures electronic device 100 to perform the processes presented in the flowcharts of FIGS. 7-9, as will be described below.

Communication module 138 enables electronic device 100 to communicate with wireless network 150 and with other devices, such as second electronic device 192, via one or more of audio, text, and video communications.

System memory 120 further includes camera or ICD types 310 and artificial intelligence (AI) engine 312. ICD types 310 contains information identifying the specific front and rear cameras 132A, 132B, 133A, 133B and 133C that are included in electronic device 100 and the characteristics of each camera.

AI engine 312 enables electronic device 100 to generate preferred camera settings for operating at least one camera while capturing images based on tracking camera settings used by a primary electronic device user. In one embodiment, AI engine 312 can track, over a period of time, camera settings associated with a primary electronic device user, generate the preferred camera settings, and store the preferred camera settings to system memory for application during later image capturing by subsequent users of electronic device 100.

System memory 120 further includes timer 318. Timer 318 tracks a time period for the secondary user to select the user-selectable option. In one embodiment, a non-frequent or secondary user can select a user-selectable option corresponding to at least one preferred camera setting for the secondary user to select to apply while capturing images using a camera.

System memory 120 further includes image capture modes 330. Image capture modes 330 are modes of operation that can be used with each of the front cameras 132A-133B and/or rear cameras 133A-133C. The examples presented of image capture modes 330 comprise single image capture mode 332, burst image capture mode 334, and video capture mode 336.

In one embodiment, a user can select one of the front cameras 132A-133B or rear cameras 133A-133C as the active camera and then can select one of the image capture modes for use with the selected camera. Single image capture mode 332 enables electronic device 100 to capture a single image. In one or more embodiments, single image capture mode 332 is a default mode setting for the image capture. Burst image capture mode 334 enables electronic device 100 to capture a sequential series of images. For example, electronic device 100 can capture an image every half a second for 5 seconds for a total of 10 captured images. Video capture mode 336 enables electronic device 100 to capture video data using the selected active camera. It is appreciated that other types of modes can be defined for use by the electronic device 100, and that those additional modes fall within the scope of the disclosure.

System memory 120 further includes current camera settings 340, preferred camera settings 342, and default camera settings 344. Current camera settings 340 are the current camera settings associated with operating each of front cameras 132A-133B and rear cameras 133A-133C. In one embodiment, current camera settings 340 can include a wide variety of camera settings. At least some of current camera settings 340 may initially be set to a default camera setting value. Current camera settings 340 can include an alignment of a subject to a horizon, a percentage of a body in a field of view, a size or percentage of a face in a field of view, a lighting level, a direction of lighting, a zoom level, a focal distance, a pan position, and at least one background characteristic, etc. Current camera settings 340 can further include shutter speed, ISO, aperture, white balance, exposure, distances to objects, and directions to objects. It is appreciated that other types of camera settings can be used by the cameras of electronic device 100, and that those additional camera settings fall within the scope of the disclosure.

Preferred camera settings 342 are camera settings associated with the primary user of electronic device 100. In an embodiment, the primary user of electronic device 100 can be an authenticated user or an owner of electronic device 100. In one embodiment, preferred camera settings 342 are generated over a period of time by electronic device 100 tracking the camera settings utilized while a primary user of electronic device 100 is capturing images/videos. Preferred camera settings 342 can be applied during image capturing by secondary or non-frequent users of electronic device 100. Default camera settings 344 are a set of pre-determined camera settings that are automatically applied when no other camera settings are specified. In one embodiment, default camera settings 344 can be used with front cameras 132A-133B and rear cameras 133A-133C during initialization and start-up of electronic device 100.

System memory 120 further includes preliminary image 350. Preliminary image 350 is an image that is automatically captured by one or more cameras of electronic device 100 after at least one camera has been selected for use or after one of the image capture modes 330 has been selected. Electronic device 100 can use preliminary image 350 to at least partially determine current camera settings 340. In one example embodiment, electronic device 100 can perform facial and scene recognition on preliminary image 350 to provide a description of the contents of preliminary image 350. In another example embodiment, electronic device 100 can determine an alignment of a subject to a horizon, a percentage of a body in a field of view and at least one background characteristic and store that information in current camera settings 340 of system memory 120.

System memory 120 further includes sensor output 360 and reference sensor output 362. Sensor output 360 is output received from at least one of front cameras 132A-133B, fingerprint sensor 147, palm sensor 170, and grip sensor 172. In one example embodiment, sensor output 360 can be an image captured by at least one of front cameras 132A-133B of a current user of electronic device 100. In another example embodiment, sensor output 360 can be the fingerprint of a current user of electronic device 100. Reference sensor output 362 corresponds to an identity of a primary user of electronic device 100 who is associated with at least one preferred camera setting 342. In an example embodiment, reference sensor output 362 can include reference user image 362A of the primary user of electronic device 100. In another example embodiment, reference sensor output 362 can be the fingerprint of the primary user of electronic device 100.

System memory 120 further includes captured image data 370. Captured image data 370 are images captured by at least one of front facing cameras 132A-132B and/or at least one of rear cameras 133A-133C. Example image data 370 includes one or more images, such as first image 372 and second image 374.

Figure 4:
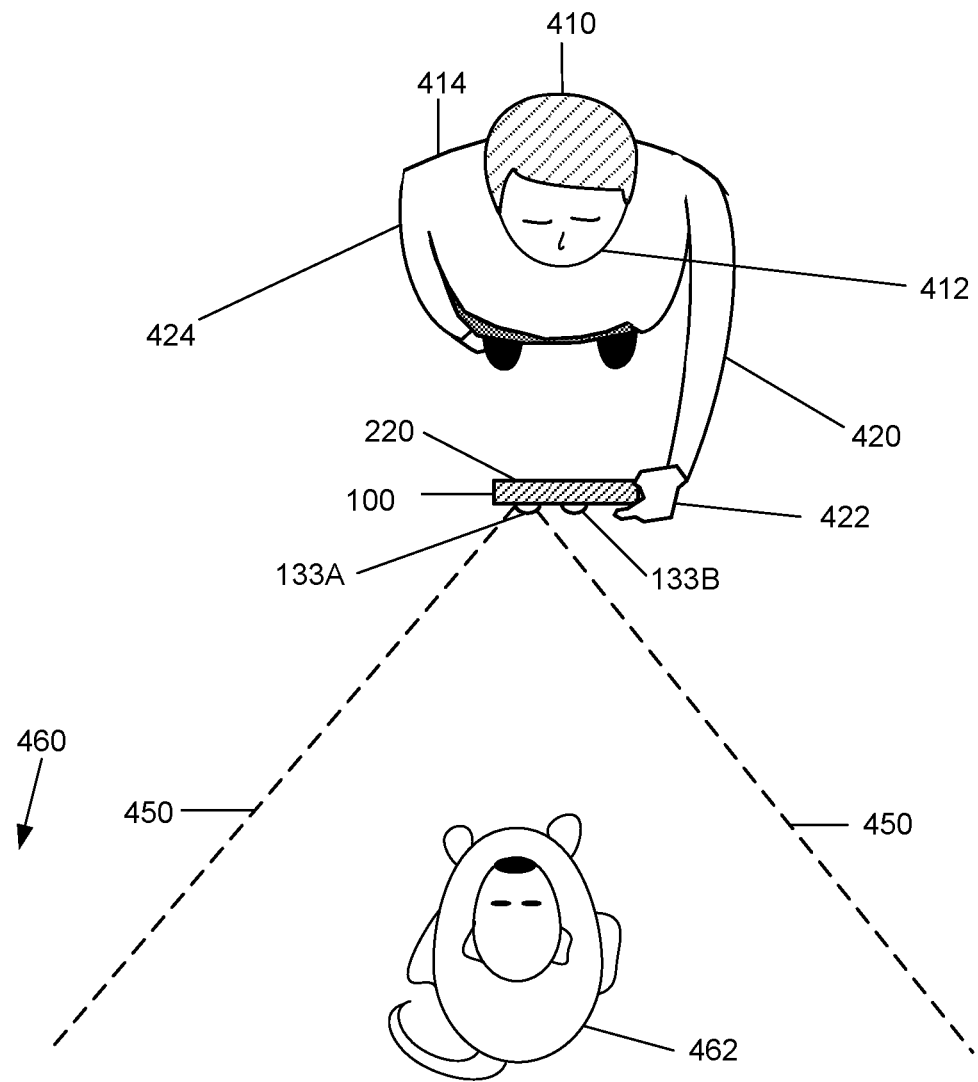
FIG. 4 is an example top view illustration of a primary electronic device user using an electronic device to capture images, according to one or more embodiments.

Referring to FIG. 4, electronic device 100 is shown positioned by a primary electronic device user 410 to capture an image. In an embodiment, the primary user of electronic device 100 can be an authenticated user or an owner of electronic device 100 or can be a frequent user of electronic device 100. In an example embodiment, primary electronic device user 410 desires to take a photograph of a dog 462. Primary electronic device user 410 can hold electronic device 100 out in front of primary electronic device user 410 using left arm 420 and left hand 422. Left hand 422 can grasp, hold, and manipulate electronic device 100. Primary electronic device user 410 further has a face 412, a torso 414, and a right arm 424.

In FIG. 4, electronic device 100 is shown with front surface 220 facing primary electronic device user 410. Rear camera 133A is oriented facing dog 462. Rear camera 133A captures images within a field of view (FOV) 450. In the example embodiment of FIG. 4, rear camera 133A has been activated in an image capturing mode (e.g., single image capture mode 332) by user selection via touch screen interface 131. During image capture, primary electronic device user 410 can select and/or change various current camera current settings 340 using an input device (i.e., touch screen interface 131) of electronic device 100 in preparation for to completing an image capture.

In an example embodiment, primary electronic device user 410 can select a zoom level camera setting for rear camera 133A such that at least 50 percent of FOV 450 is taken up by dog 462. In another example embodiment, primary electronic device user 410 can select a zoom level camera setting for rear camera 133A such that important features of interest (i.e., dog 462) in a primary FOV (i.e., FOV 450) are identified and captured and non-important features in a secondary field of view 460 are substantially eliminated from capture.

During image capture by primary electronic device user 410, electronic device 100 can track, over a period of time, the various current camera settings 340 selected by primary electronic device user 410, and generate preferred camera settings 342, which are recorded/stored to the device memory.

According to one aspect of the disclosure, electronic device 100 can track, over a period of time, current camera settings 340 associated with primary electronic device user 410 capturing images via rear camera 133A. Electronic device 100 can process the current camera settings 340 through AI engine 312, which generates a plurality of preferred camera settings 342 for operating rear camera 133A while capturing images. Electronic device 100 can store the plurality of preferred camera settings 342 to system memory 120 for application during later image capturing by secondary or subsequent users using rear camera 133A.

Figure 5:
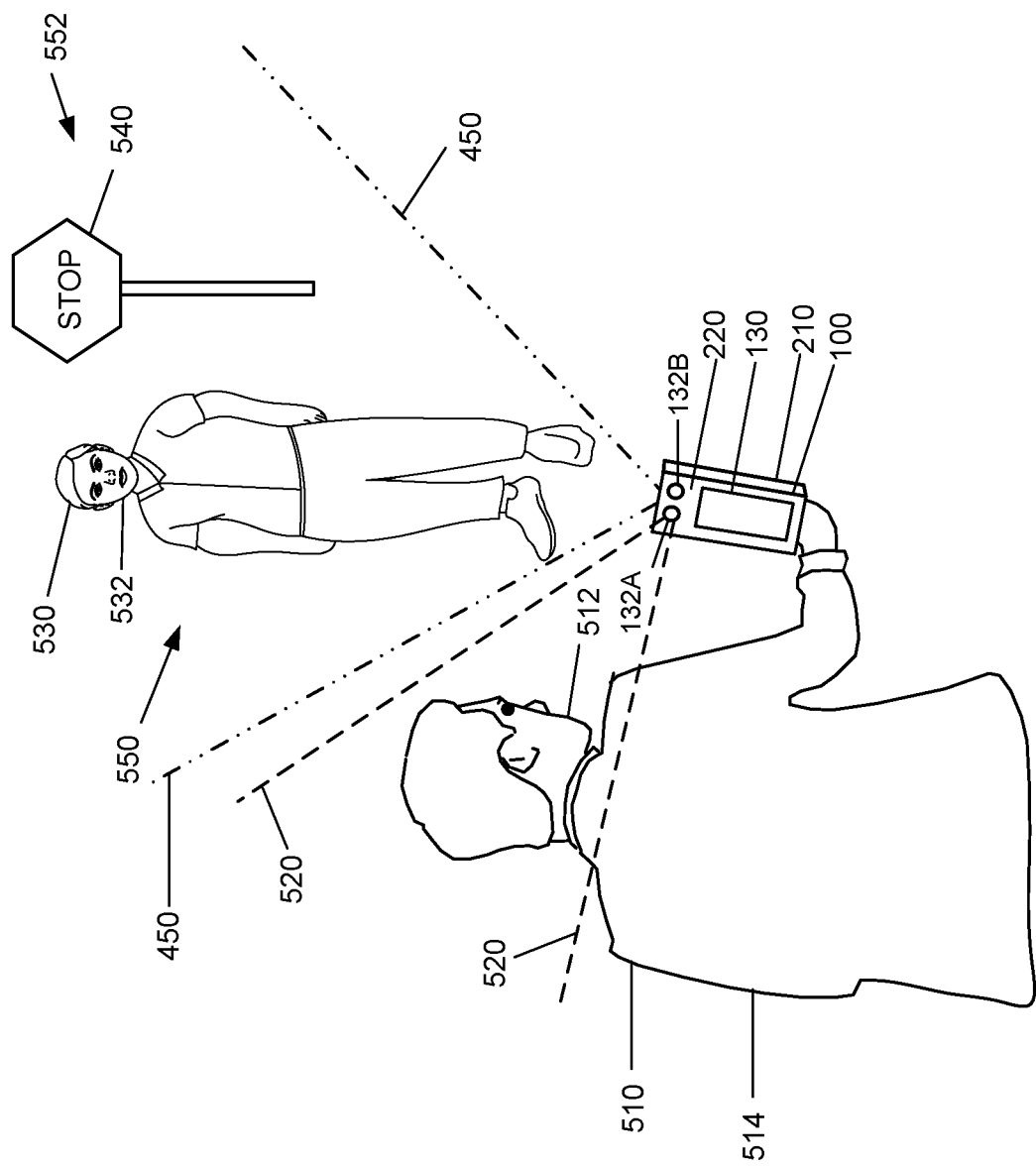
FIG. 5 is an example illustration of a secondary electronic device user using an electronic device to capture images using preferred camera settings of a primary user, according to one or more embodiments.

FIG. 5 illustrates electronic device 100 being used by a secondary electronic device user 510 after single image capture mode 332 has been selected for image capture. Referring to FIG. 5, electronic device 100 has been positioned by secondary electronic device user 510 such that the front cameras 132A-132B face secondary electronic device user 510 and the rear cameras 133A-133C face a primary region of interest (ROI) 550 and a secondary ROI 552. Primary ROI 550 contains an individual 530 and secondary ROI 552 contains a stop sign 540. Individual 530 has a face 532. Primary ROI 550 can contain important features of interest such as an individual 530 and secondary ROI 552 can contain non-important features of interest such as a stop sign 540.

Front camera 132A has a FOV 520 that captures first image 372 containing the face 512 and a portion of torso 514 of secondary electronic device user 510. According to one aspect of the disclosure, CCM 136 enables electronic device 100 to determine if the first image 372 is substantially similar to reference user image 362A. In response to the first image 372 not being substantially similar to the reference user image, electronic device 100 identifies that secondary electronic device user 510 is not the primary electronic device user 410. This identification then serves as a trigger for processor 102 to surface the notification for selection of the preferred camera settings for secondary user 510 to utilize when capturing the image with rear camera 133A. The identification of the secondary electronic device user occurs prior to presenting the preferred camera settings.

Rear camera 133A has a FOV 450 that can capture preliminary image 350 incorporating primary ROI 550. After single image capture mode 332 has been selected for image capture, electronic device 100 can capture preliminary image 350. Electronic device 100 can use preliminary image 350 to at least partially determine current camera settings 340.

Figure 6A:
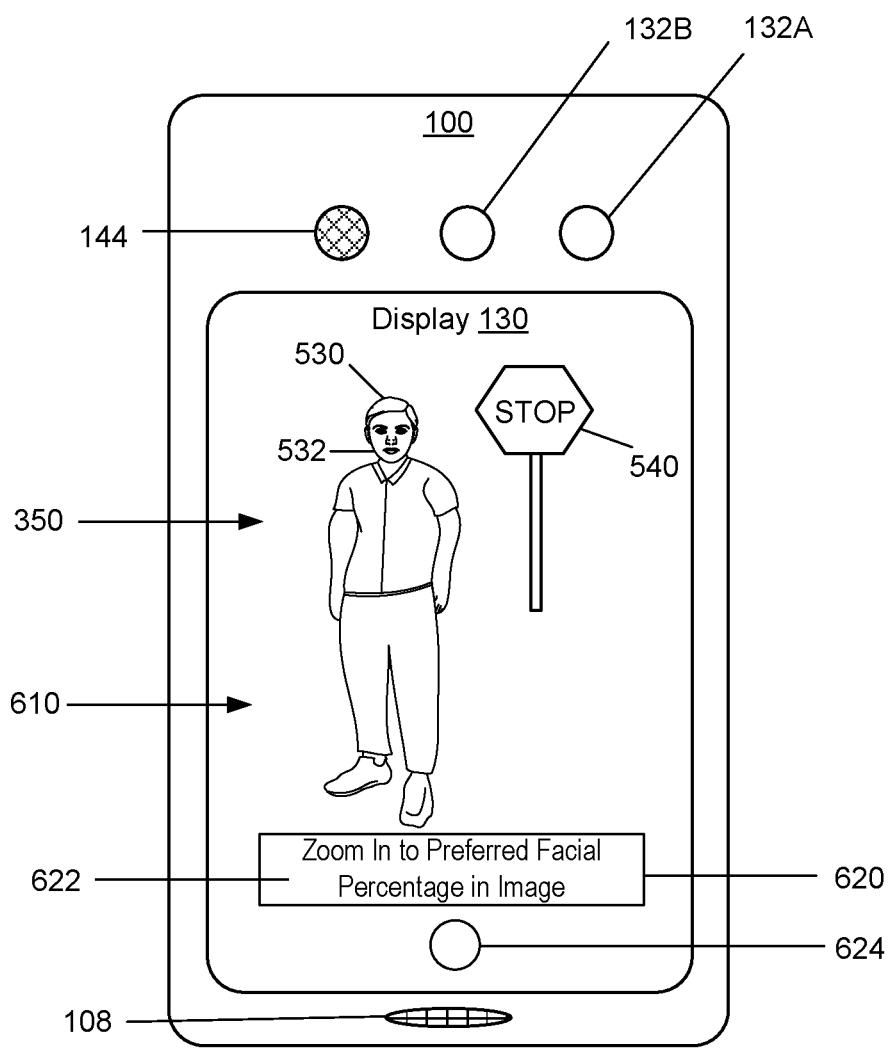
FIG. 6A illustrates content on a display of the electronic device of FIG. 5, after a preliminary image has been captured and after the secondary device user has been presented a user-selectable option to complete the image capture using at least one preferred camera setting, according to one or more embodiments.

With additional reference now to FIG. 6A, electronic device 100 is illustrated with an example GUI 610 presented on display 130, after electronic device 100 has identified that secondary electronic device user 510 is operating electronic device 100 and after single image capture mode 332 has been selected for image capture. GUI 610 presents preliminary image 350, image capture icon 624, and a user-selectable option icon 620 corresponding to at least one preferred camera setting 342 for the secondary electronic device user 510 to select to apply while capturing images using rear camera 133A.

According to one aspect of the disclosure, CCM 136 enables electronic device 100 to determine if the current camera settings 340 are substantially similar to the preferred camera settings 342. In response to determining that the current camera settings 340 are not substantially similar to the preferred camera settings 342, electronic device 100 presents secondary electronic device user 510 with at least one user-selectable option icon 620. User-selectable option icon 620 can include or present a notification 622 indicating that the current camera setting 340 is not substantially similar to the preferred camera setting 342.

In one embodiment, contemporaneously with presenting notification 622 on display 130, electronic device 100 can output, via speakers 144, an audio alert to trigger the secondary electronic device user 510 to select the at least one user-selectable option. In another embodiment, contemporaneously with presenting notification 622 on display 130, electronic device 100 can generate a haptic alert presented by vibration device 146 to trigger the secondary electronic device user 510 to select the at least one user-selectable option.

In the example embodiment of FIG. 6A, electronic device 100 can determine that a current camera setting of a percentage of face 532 in FOV 450 is not substantially similar to the preferred camera setting of a percentage of face 532 in FOV 450. In one embodiment, the preferred camera setting of a percentage of a face in the FOV can be 50 percent of the FOV. The notification 622 can prompt the secondary device user 510 to select the preferred facial percentage captured in the image. Electronic device 100 can present user-selectable option icon 620 on display 130 for the secondary device user 510 to select to apply while capturing images using rear camera 133A.

Figure 6B:
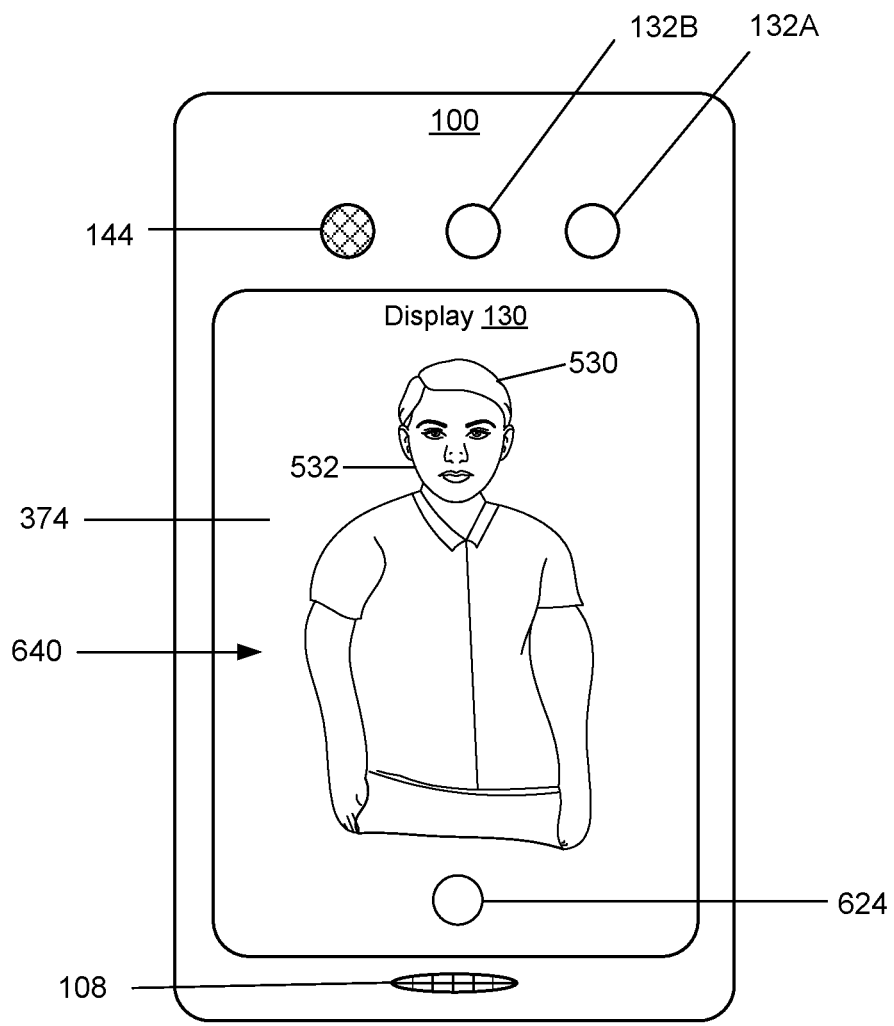
FIG. 6B illustrates content on a display of the electronic device of FIG. 5, after the secondary device user has selected the user-selectable option to complete the image capture using at least one preferred camera setting, according to one or more embodiments.

With additional reference now to FIG. 6B, electronic device 100 is illustrated with an example GUI 640 presented on display 130 after user-selectable option icon 620 has been selected by secondary electronic device user 510. In one embodiment, after selecting user-selectable option icon 620, electronic device 100 can automatically modify the current camera settings 340 to the preferred camera settings 342 (i.e., zoom into the preferred facial percentage). Electronic device 100 can then automatically capture second image 374 using the preferred camera setting 342 for rear camera 133A.

In another embodiment, after selecting user-selectable option icon 620 and receiving the notification of the 50% facial percentage setting, a user can touch preliminary image 350 (FIG. 6A), on touch screen interface 131 with two fingers and can move both fingers in order to zoom into the preferred facial percentage. The user can then capture second image 374 using image capture icon 624.

In another embodiment, user-selectable option icon 620 can include a notification 622 corresponding to a preferred camera setting 342 of an alignment of a subject or individual to a horizon. After selection of user-selectable option icon 620, by secondary electronic device user 510, electronic device 100 can guide a secondary electronic device user 510 to tilt electronic device 100 to the preferred alignment to a horizon. Electronic device 100 can guide the secondary electronic device user 510 to tilt electronic device 100 to the proper angle by presenting a haptic alert via vibration device 146. Electronic device 100 can identify that electronic device 100 has been tilted to the preferred alignment to the horizon and then automatically capture second image 374 via rear camera 133A.

According to one aspect of the disclosure, in response to selection of user-selectable option icon 620, electronic device 100 modifies at least one current camera setting 340 for one of rear cameras 133A-133C such that important features of interest (e.g., face 532) in a primary ROI 550 (FIG. 5), are identified and captured and non-important features (i.e., stop sign 540) in a secondary ROI 552 (FIG. 5), are substantially eliminated from capture.

According to another aspect of the disclosure, electronic device 100 can determine that the current camera settings 340 are substantially similar to the preferred camera settings 342. Electronic device 100 can automatically capture first image 372 using the current camera settings 340 and store first image 372 to system memory 120.

According to one aspect of the disclosure, CCM 136 enables electronic device 100 to detect activation of a first camera (e.g., rear camera 133A) to a first image capturing mode (e.g., single image capturing mode 332). Electronic device 100 further presents on display 130, a first GUI 610 comprising at least one user-selectable option 620 corresponding to at least one preferred camera setting 342 for a secondary electronic device user 510 to select to apply while capturing images using the first camera.

According to another aspect of the disclosure, CCM 136 enables electronic device 100 to receive a first sensor output 360 from at least one sensor (i.e., from either front cameras 132A-133B, fingerprint sensor 147, palm sensor 170, or grip sensor 172). Electronic device 100 determines if the first sensor output 360 is substantially similar to a reference sensor output 362 that corresponds to an identity of a primary user 410 of the electronic device who is associated with at least one preferred camera setting 342. In response to the first sensor output 360 not being substantially similar to the reference sensor output 362, electronic device 100 retrieves and presents the at least one preferred camera setting 342 as a user-selectable option 620 for operating the first camera (e.g., rear camera 133A) during image capture. In response to the first sensor output 360 being substantially similar to the reference sensor output 362, electronic device 100 configures rear camera 133A to operate according to the at least one preferred camera setting 342 and triggers rear camera 133A to complete image capture using the at least one preferred camera setting 342 unless/until the first user modifies or changes one or more of the at least one preferred camera settings 342.

According to another aspect of the disclosure, electronic device 100 can transmit, via a wireless communication device 164, the at least one preferred camera setting 342 for operating the first camera from electronic device 100 to a second electronic device 192. The second electronic device 192 then uses the at least one preferred camera setting 342 for capturing images via at least one camera of the second electronic device 192.

In one or more embodiments, electronic device 100 performs facial recognition on preliminary image 350 in order to identify whether the primary user 410 is one of the subjects captured in preliminary image 350. Identifying the primary user within the captured preliminary image can trigger processor 102 to surface the notification 622 requesting the secondary user 510 select the preferred settings 342 of the primary user when taking the photograph or video. In one or more embodiments, in which electronic device 100 has both front and rear cameras, a second preliminary image is captured of the current user of the device and the processor performs facial recognition on a face of the current user to determine if the current user is the primary user 410 or a secondary user. Processor 102 can then optionally surface the notification 622 when the current user is the primary user and/or monitor and record the settings being used by the primary user to track changes in the preferences of the primary user, based on the image being captured.

Figure 6C:
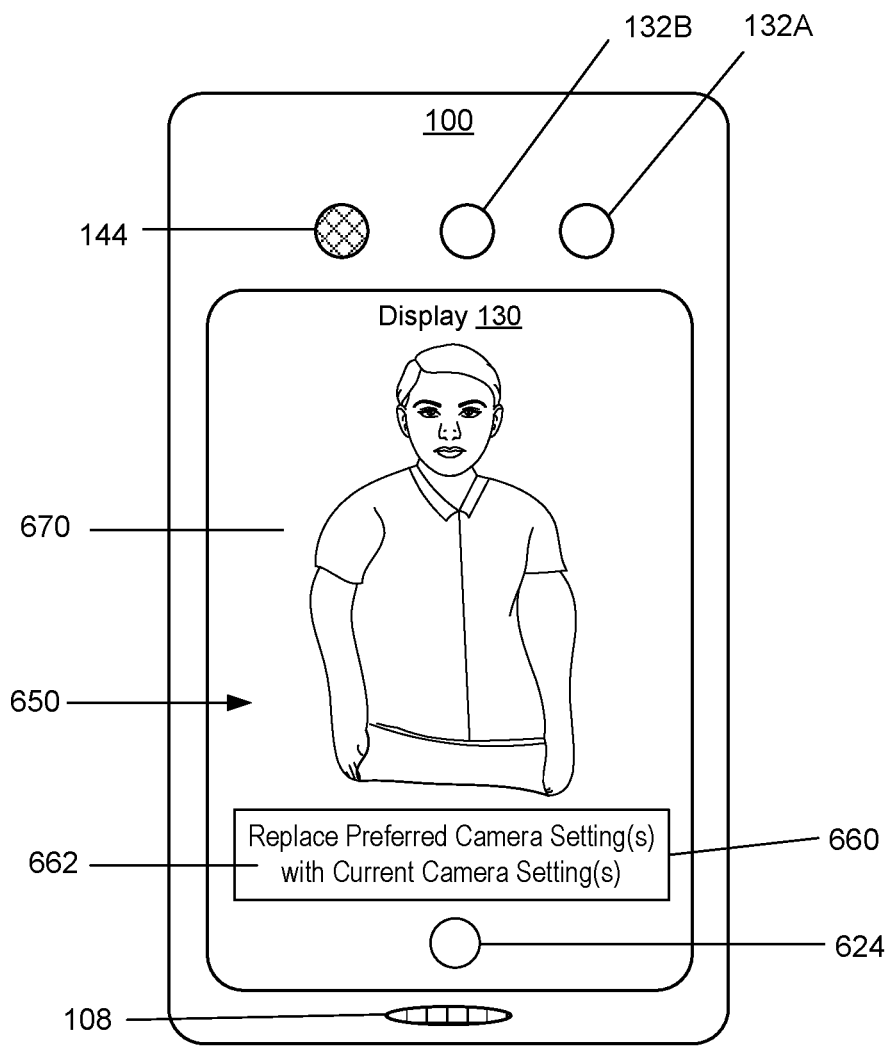
FIG. 6C illustrates content on a display of an electronic device after a primary user has captured an image and has been presented a user-selectable option to replace preferred camera settings with current camera settings, according to one or more embodiments.

Turning to FIG. 6C, electronic device 100 is illustrated with an example GUI 650 presented on display 130, after electronic device 100 has captured an image 670. Primary user 410 has been presented a user-selectable option to replace preferred camera settings with current camera settings. GUI 610 presents image 670 and a user-selectable option icon 660 corresponding to replacing at least one preferred camera setting 342 with at least one of the current camera settings 340.

According to one aspect of the disclosure, CCM 136 enables electronic device 100 to determine if the current camera settings 340 are not substantially similar to the preferred camera settings 342 or the default camera settings 344. In response to determining that the current camera settings 340 are not substantially similar to the preferred camera settings 342 or the default camera settings 344, electronic device 100 presents primary electronic device user 410 with at least one user-selectable option icon 660 that, when selected, replaces at least one of the preferred camera settings with at least one of the current camera settings.

In one embodiment, more than one user-selectable option icon 660 can be presented, where each user-selectable option icon 660 corresponds to a selected camera setting to be replaced. User-selectable option icon 660 can include a notification 662 corresponding to replacing the preferred camera settings with the current camera settings. In response to the primary electronic device user selecting user-selectable option icon 660, electronic device 100 replaces the preferred camera settings 342 or default camera settings 344 with the selected current camera settings 340.

Figure 7:
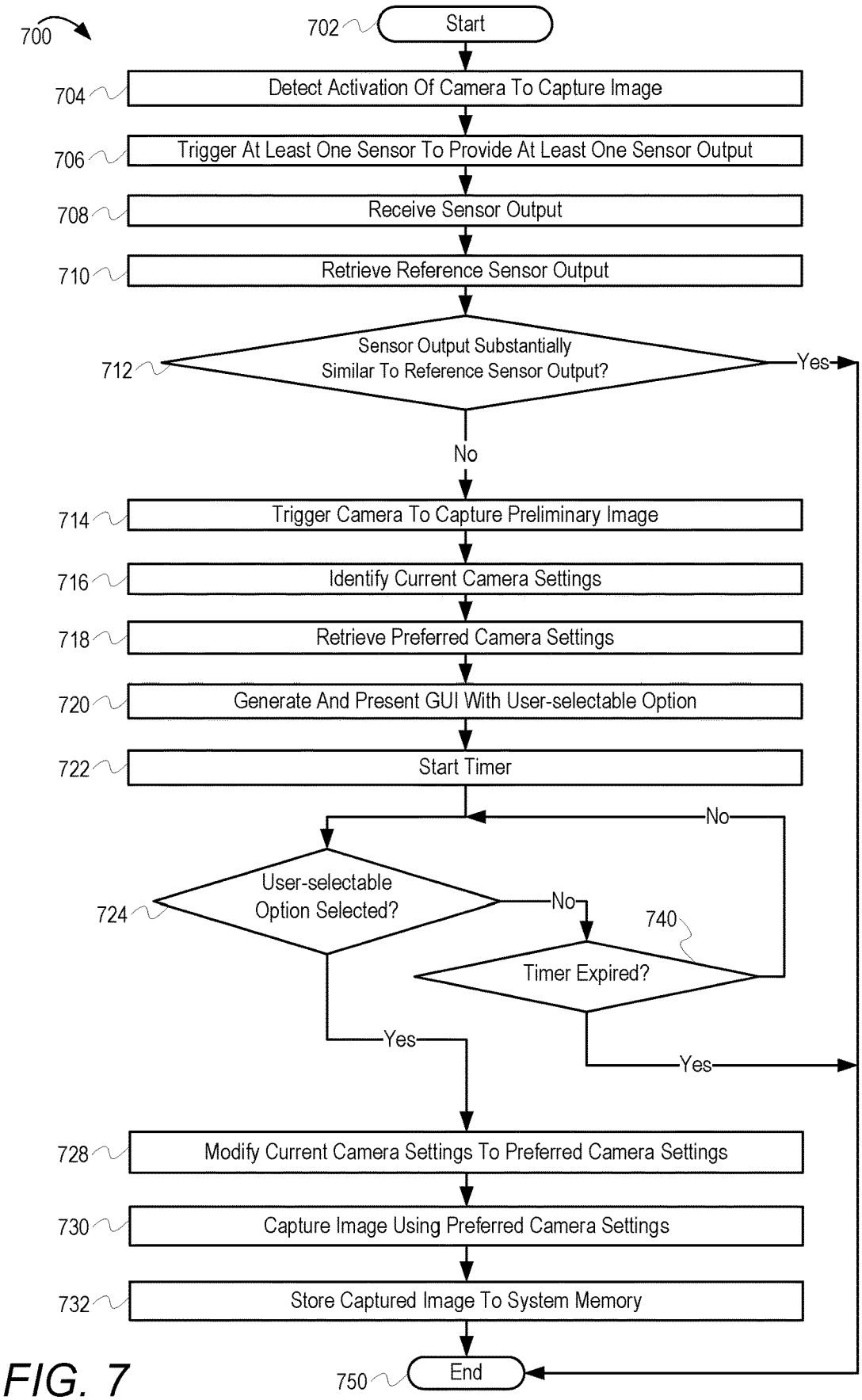
FIG. 7 depicts a flowchart of a method by which an electronic device identifies a secondary electronic device user and presents a GUI to use preferred camera settings to complete an image capture, according to one or more embodiments.
Figure 8:
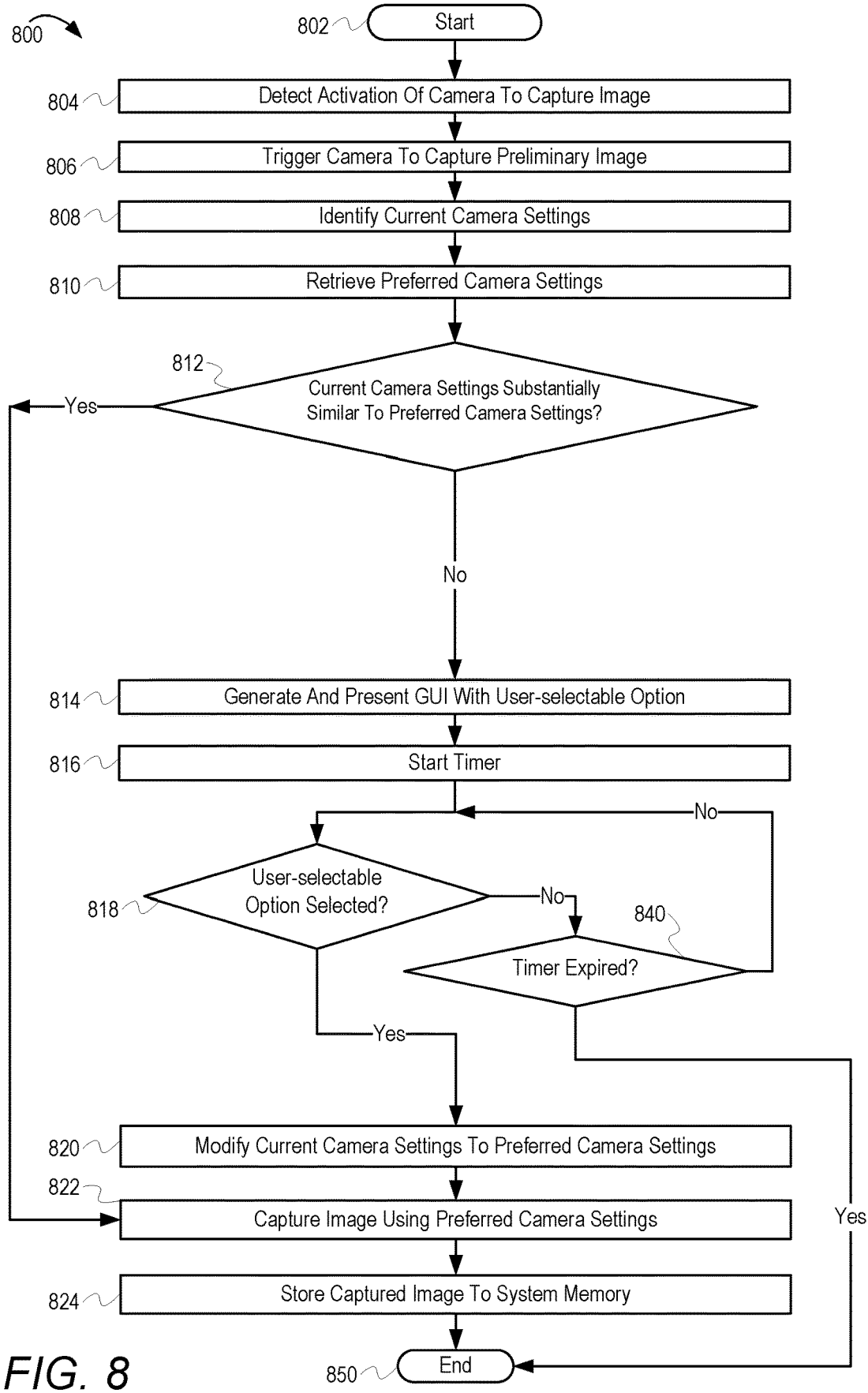
FIG. 8 depicts a flowchart of a method by which an electronic device automatically captures images when at least one current camera parameter is substantially similar to at least one preferred camera parameter, according to one or more embodiments.
Figure 9:
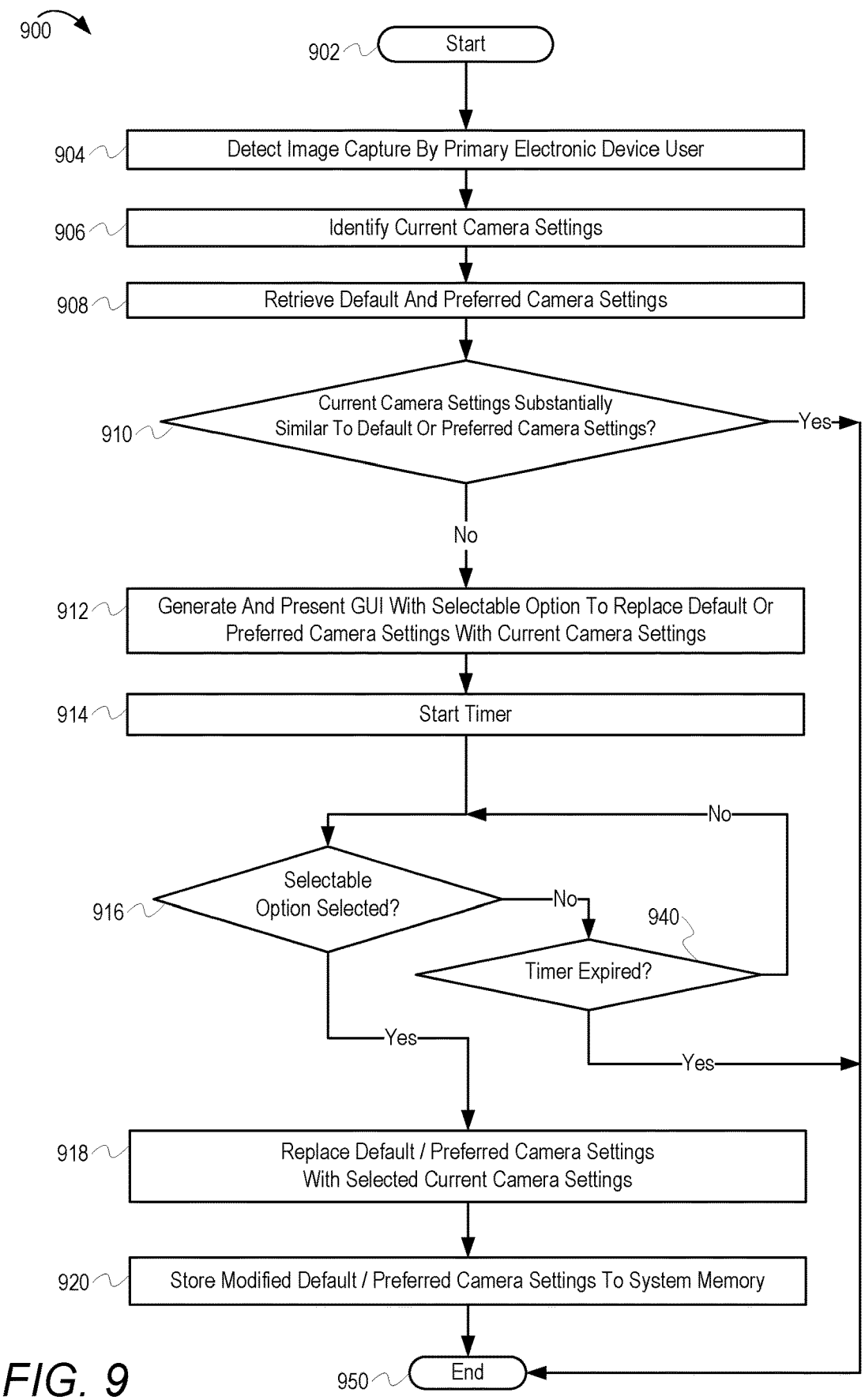
FIG. 9 depicts a flowchart of a method by which an electronic device replaces default and/or preferred camera settings with a current camera setting, according to one or more embodiments.

FIG. 7 depicts method 700 by which electronic device 100 identifies a secondary electronic device user and presents a user-selected option to use preferred camera settings to complete an image capture. FIG. 8 depicts method 800 by which electronic device 100 automatically captures an image when at least one current camera parameter is substantially similar to at least one preferred camera parameter. FIG. 9 depicts method 900 by which electronic device 100 replaces default and/or preferred camera settings with a current camera setting, according to one or more embodiments. The description of methods 700, 800, and 900 will be described with reference to the components and examples of FIGS. 1-6B.

The operations depicted in FIGS. 7, 8, and 9 can be performed by electronic device 100 or any suitable electronic device that includes front and rear cameras and the one or more functional components of electronic device 100 that provide/enable the described features. One or more of the processes of the methods described in FIGS. 7, 8, and 9 may be performed by processor 102 executing program code associated with CCM 136, and by AI engine 312.

With specific reference to FIG. 7, method 700 begins at the start block 702. At block 704, processor 102 detects activation of single image capture mode 332 for one of the front cameras or rear cameras (e.g., rear camera 133A). During activation of the camera, the default camera settings 344 are retrieved from system memory 120 and set as the initial camera settings. After the initial camera settings are set, a user may choose to modify the camera settings. Processor 102 triggers at least one sensor (e.g., front camera 132A) to provide a sensor output 360 (e.g., first image 372) (block 706) and receives the sensor output 360 (e.g., first image 372) (block 708). In one embodiment, the at least one sensor can be front camera 132A. In another embodiment, the at least one sensor can be one of fingerprint sensor 147, palm sensor 170, and grip sensor 172. Processor 102 retrieves reference sensor output 362 from system memory 120 (block 710).

Processor 102 determines, at decision block 712, if the sensor output 360 (e.g., first image 372) is substantially similar to the reference sensor output 362. In response to determining that the sensor output 360 (e.g., first image 372) is substantially similar to the reference sensor output 362 (i.e., the camera is being operated by the primary user), the primary user can adjust or modify the camera settings and method 700 terminates at end block 750. When the sensor output is substantially similar to the reference sensor output, electronic device 100 is being operated by primary electronic device user 410. In response to determining that the sensor output 360 (e.g., first image 372) is not substantially similar to the reference sensor output 362, processor 102 triggers the activated camera (e.g., rear camera 133A) to capture preliminary image 350 (block 714) and identifies the current camera settings 340 (block 716). Processor 102 retrieves preferred camera settings 342 from system memory 120 (block 718). When the sensor output is not substantially similar to the reference sensor output, electronic device 100 is being operated by secondary electronic device user 510.

Processor 102 generates and presents on display 130, GUI 610 comprising at least one user-selectable option icon 620 corresponding to at least one preferred camera setting 342 for secondary electronic device user 510 to select to apply while capturing images (block 720). Processor 102 starts timer 318 (block 722). In one embodiment, GUI 610 can comprise multiple user-selectable option icons, with each user-selectable option icon corresponding to a respective camera setting. Processor 102 determines if secondary electronic device user 510 has selected user-selectable option icon 620 (decision block 724). In response to determining that secondary electronic device user 510 has selected user-selectable option icon 620, processor 102 modifies the current camera settings 340 to the preferred camera settings 342 (block 728). In an example embodiment, the zoom level camera setting can be modified to the preferred facial percentage. Processor 102 captures second image 374 using the preferred camera setting 342 for rear camera 133A (block 730) and stores the captured second image 374 to system memory 120 (block 732). Method 700 ends at end block 750.

In response to determining that secondary electronic device user 510 has not selected user-selectable option icon 620, processor 102 checks if timer 318 has expired (decision block 740). In one example, timer 318 can be set for 10 seconds. In response to determining that timer 318 has expired, method 700 ends at end block 750. In response to determining that timer 318 has not expired, processor 102 continues to determine if secondary electronic device user 510 has provided user input by selecting user-selectable option icon 620 at decision block 724. Alternatively, second user 510 can also modify the device camera settings, which triggers another comparison with the preferred camera settings.

Referring to FIG. 8, there is presented method 800 by which electronic device 100 automatically captures an image when at least one current camera parameter is substantially similar to at least one preferred camera parameter. Method 800 begins at the start block 802. At block 804, processor 102 detects activation of single image capture mode 332 for one of the front cameras or rear cameras (e.g., rear camera 133A). Processor 102 triggers rear camera 133A to capture preliminary image 350 (block 806) and identifies the current camera settings 340 (block 808). Processor 102 retrieves preferred camera settings 342 from system memory 120 (block 810).

Processor 102 determines if current camera settings 340 are substantially similar to preferred camera settings 342 (decision block 812). In response to determining that the current camera settings 340 are substantially similar to preferred camera settings 342, processor 102 captures second image 374 using the preferred camera setting 342 for rear camera 133A (block 822) and stores the captured second image 374 to system memory 120 (block 824). Method 700 ends at end block 850.

In response to determining that the current camera settings 340 are not substantially similar to preferred camera settings 342, processor 102 generates and presents on display 130, GUI 610 comprising at least one user-selectable option icon 620 corresponding to at least one preferred camera setting 342 for an electronic device user to select to apply while capturing images (block 814). Processor 102 starts timer 318 (block 816). Processor 102 determines if the electronic device user has selected user-selectable option icon 620 (decision block 818). In response to determining that the user-selectable option icon 620 has been selected, processor 102 modifies the current camera settings 340 to the preferred camera settings 342 (block 820). In an example embodiment, the zoom level camera setting can be modified to the preferred facial percentage. Processor 102 captures second image 374 using the preferred camera setting 342 for rear camera 133A (block 822) and stores the captured second image 374 to system memory 120 (block 824). Method 800 terminates at end block 850.

In response to determining that the user-selectable option icon 620 has not been selected, processor 102 checks if timer 318 has expired (decision block 840). In one example, timer 318 can be set for 10 seconds. In response to determining that timer 318 has expired, method 800 ends at end block 850. In response to determining that timer 318 has not expired, processor 102 continues to determine if the electronic device user has provided user input by selecting user-selectable option icon 620 at decision block 818.

Referring to FIG. 9, there is presented method 900 by which electronic device 100 replaces default and/or preferred camera settings with a current camera setting. Method 900 begins at the start block 902. At block 904, processor 102 detects that primary electronic device user 410 has captured an image (e.g., image 670) via one of the front cameras or rear cameras (e.g., rear camera 133A). Processor 102 identifies the current camera settings 340 from image 670 (block 906). Processor 102 retrieves previously-stored preferred camera settings 342 and default camera settings 344 from system memory 120 (block 908).

Processor 102 determines if the current camera settings 340 are substantially similar to the previously-stored preferred camera settings 342 or the default camera settings 344 (decision block 910). In response to determining that the current camera settings 340 are substantially similar to the previously-stored preferred camera settings 342 or the default camera settings 344, method 900 ends at end block 950.

In response to determining that the current camera settings 340 are not substantially similar to the previously-stored preferred camera settings 342 or the default camera settings 344, processor 102 generates and presents on display 130, a GUI 650 comprising at least one user-selectable option icon 660 to replace at least one of the preferred camera settings 342 or the default camera settings with the at least one of the current camera settings 340 (block 912). Processor 102 starts timer 318 (block 914).

Processor 102 determines if the primary electronic device user 410 has selected the user-selectable option icon 660 to replace at least one of the preferred camera settings 342 or the default camera settings with the at least one of the current camera settings 340 (decision block 916). In response to determining that the user-selectable option icon 660 has been selected, processor 102 replaces the preferred camera settings 342 or default camera settings 344 with the selected current camera settings 340 (block 918). Processor 102 stores the modified preferred camera settings 342 or default camera settings 344 to system memory 120 (block 920). Method 900 terminates at end block 950.

In response to determining that the user-selectable option icon 660 has not been selected, processor 102 checks if timer 318 has expired (decision block 940). In one embodiment, timer 318 can be set for 10 seconds. In response to determining that timer 318 has expired, method 900 ends at end block 950. In response to determining that timer 318 has not expired, processor 102 continues to determine if the electronic device user has provided user input by selecting user-selectable option icon 660 at decision block 916.

In the above-described methods of FIGS. 7-9, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
   at least one camera including a first camera;
   a display;
   a memory having stored thereon a camera control module (CCM) for controlling the first camera via one of a plurality of selectable image capturing modes; and
   at least one processor communicatively coupled to each of the at least one camera, the display, and to the memory, the at least one processor program code of the CCM and is configured to cause the electronic device to:
      in response to activation of the first camera to a first image capturing mode:
         determine whether a current user of the electronic device is a primary user of the electronic device;
         determine whether current camera settings are substantially similar to preferred camera settings of the primary user; and
         in response to at least one of the current user not being the primary user or the current camera settings not being substantially similar to the preferred camera settings, present, on the display for viewing by the current user, a first graphical user interface (GUI) comprising at least one user-selectable option corresponding to at least one preferred camera setting of the primary user to apply while the current user is capturing images using the first camera.

2. The electronic device of claim 1, further comprising:
at least one sensor communicatively coupled to the at least one processor; and
wherein, to present the first GUI, the at least one processor:
receives a first sensor output from the at least one sensor;
determines if the first sensor output is substantially similar to a reference sensor output that corresponds to an identity of the primary user of the electronic device who is associated with the at least one preferred camera setting; and
in response to the first sensor output not being substantially similar to the reference sensor output: determines that the current user is a secondary user who is not the primary user and has not established specific settings for taking pictures or videos using the at least one camera of the electronic device; and triggers a retrieval and presentation of the at least one preferred camera setting as a selectable option for the secondary user operating the first camera during image capture.

3. The electronic device of claim 2, further comprising:
at least one audio output device communicatively coupled to the at least one processor; and
wherein, contemporaneously with the presenting of the at least one preferred camera setting, the at least one processor:
outputs, via the at least one audio output device, an audio alert to trigger the secondary user to select the at least one user-selectable option;
in response to selection of the at least one user-selectable option by the secondary user, modifies a current camera setting to the at least one preferred camera setting; and
capture images using the at least one preferred camera setting for the first camera.

4. The electronic device of claim 2, further comprising:
at least one vibration device communicatively coupled to the at least one processor; and
wherein, contemporaneously with the presenting of the at least one preferred camera setting, the at least one processor:
generates a haptic alert presented by the at least one vibration device to trigger the secondary user to select the at least one user-selectable option;
in response to selection of the at least one user-selectable option by the secondary user, modifies a current camera setting to the at least one preferred camera setting; and
captures images using the at least one preferred camera setting for the first camera.

5. The electronic device of claim 2, further comprising:
a housing having a first surface and a second surface opposed to the first surface, the first camera disposed at the first surface;
a second camera of the at least one camera communicatively coupled to the at least one processor, the second camera disposed at the second surface and operating as the at least one sensor; and
wherein, prior to presenting of the at least one preferred camera setting, the at least one processor:
captures, via the second camera, a second image containing a face of the current user;
determines if the second image is substantially similar to a reference user image; and
in response to the second image not being substantially similar to the reference user image:
identifies that the current user is not the primary user of the electronic device; and
triggers the presentation of the first GUI comprising the at least one user-selectable option.

6. The electronic device of claim 1, further comprising:
at least one input device communicatively coupled to the at least one processor; and
wherein the at least one processor:
receives, via the at least one input device, a first input corresponding to selection of the at least one user-selectable option; and
in response to receiving the first input:
modifies at least one first camera parameter;
captures, via the first camera, a first image using the modified at least one first camera parameter; and
stores the first image to the memory.

7. The electronic device of claim 1, wherein the at least one preferred camera setting for operating the first camera is set based on device user settings during image capture, and the at least one processor:
detects operation of the electronic device by a primary electronic device user to capture one or more images using the first camera;
during capture of the one or more images by the primary electronic device user, detects a current camera setting;
retrieves one of a default camera setting and a previously-stored first preferred camera setting for operating the first camera;
determines if the current camera setting is substantially similar to the previously-stored first preferred camera setting;
in response to determining that the current camera setting is not the default camera setting and is not substantially similar to the previously-stored first preferred camera setting, presents the primary electronic device user with an option to replace at least one of the default first camera setting and the previously-stored first preferred camera setting with the current camera setting.

8. The electronic device of claim 7, wherein the at least one processor further:
in response to determining that the current camera setting is substantially similar to the at least one preferred camera setting: captures, via the first camera, a first image using the current camera setting; and stores the first image to the memory.

9. The electronic device of claim 1, wherein the at least one processor further:
tracks, over a period of time, a plurality of camera settings associated with a primary electronic device user capturing images via the first camera;
processes the plurality of camera settings through an artificial intelligence engine, which generates a plurality of preferred camera settings for operating the first camera while capturing images; and
stores the plurality of preferred camera settings to the memory for application during later image capturing by subsequent users using the first camera.

10. The electronic device of claim 1, further comprising:
a wireless communication device communicatively coupled to the at least one processor and enabling transmission of information from the electronic device; and
wherein the at least one processor:

transmits, via the wireless communication device, the at least one preferred camera setting for operating the first camera from the electronic device to a second electronic device, wherein the second electronic device uses the at least one preferred camera setting for capturing images via at least one camera of the second electronic device.

11. The electronic device of claim 1, wherein the at least one preferred camera setting is a first zoom level that identifies and captures important features of interest in a primary field of view and substantially eliminates capturing non-important features in a secondary field of view.

12. A method comprising:
in response to activation, via a processor, of a first camera of an electronic device to an image capturing mode:
determining whether a current user of the electronic device is a primary user of the electronic device;
determining whether current camera settings are substantially similar to preferred camera settings of the primary user; and
in response to at least one of the current user not being the primary user or the current camera settings not being substantially similar to the preferred camera settings, presenting on a display of the electronic device for viewing by the current user, a first graphical user interface (GUI) comprising at least one user-selectable option corresponding to at least one preferred camera setting of the primary user to apply while the current user is capturing images using the first camera.

13. The method of claim 12, wherein, prior to presenting the first GUI, the method comprises:
receiving a first sensor output from at least one sensor;
determining if the first sensor output is substantially similar to a reference sensor output that corresponds to an identity of the primary user of the electronic device who is associated with the at least one preferred camera setting; and
in response to the first sensor output not being substantially similar to the reference sensor output: determining that the current user is a secondary user who is not the primary user and has not established specific settings for taking pictures or videos using the at least one camera of the electronic device; and triggering a retrieval and presentation of the at least one preferred camera setting as a selectable option for the secondary user operating the first camera during image capture.

14. The method of claim 13, wherein, contemporaneously with the presenting of the at least one preferred camera setting, the method further comprises:
generating a haptic alert presented by at least one vibration device to trigger the secondary user to select the at least one user-selectable option;
in response to selection of the at least one user-selectable option by the secondary user, modifying a current camera setting to the at least one preferred camera setting; and
capturing images using the at least one preferred camera setting for the first camera.

15. The method of claim 13, wherein prior to presenting of the at least one preferred camera setting, the method further comprises:
capturing, via a second camera, a second image containing a face of the current user;
determining if the second image is substantially similar to a reference user image; and
in response to the second image not being substantially similar to the reference user image:
identifying that the current user is not the primary user of the electronic device; and
triggering the presentation of the first GUI comprising the at least one user-selectable option.

16. The method of claim 12, wherein, contemporaneously with the presenting of the at least one preferred camera setting, the method further comprises:
outputting, via at least one audio output device, an audio alert to trigger the secondary user to select the at least one user-selectable option;
in response to selection of the at least one user-selectable option by the secondary user, modifying a current camera setting to the at least one preferred camera setting; and
capturing images using the at least one preferred camera setting for the first camera.

17. The method of claim 12, further comprising:
receiving, via at least one input device, a first input corresponding to selection of the at least one user-selectable option;
in response to receiving the first input, modifying at least one first camera parameter;
capturing, via the first camera, a first image using the modified at least one first camera parameter; and
storing the first image to a memory.

18. The method of claim 12, wherein the at least one preferred camera setting for operating the first camera is set based on a device user setting during image capture, and the method further comprises:
detecting operation of the electronic device by a primary electronic device user to capture one or more images using the first camera;
during capture of the one or more images by the primary electronic device user, detecting a current camera setting;
retrieving one of a default camera setting and a previously-stored first preferred camera setting for operating the first camera;
determining if the current camera setting is substantially similar to the previously-stored first preferred camera setting; and
in response to determining that the current camera setting is not the default camera setting and is not substantially similar to the previously-stored first preferred camera setting, presenting the primary electronic device user with an option to replace at least one of the default camera setting and the previously-stored first preferred camera setting with the current camera setting.

19. The method of claim 18, further comprising:
in response to determining that the current camera setting is substantially similar to the preferred camera setting:
capturing, via the first camera, a first image using the current camera setting; and storing the first image to a memory.

20. A computer program product comprising:
a non-transitory computer readable storage device having stored thereon program code which, when executed by at least one processor of an electronic device having a display, a first camera, and a memory, enables the electronic device to complete the functionality of:
in response to activation of the first camera to a first image capturing mode:
determining whether a current user of the electronic device is a primary user of the electronic device;

determining whether current camera settings are substantially similar to preferred camera settings of the primary user; and in response to at least one of the current user not being the primary user or the current camera settings not being substantially similar to the preferred camera settings, presenting on a display of the electronic device for viewing by the current user, a first graphical user interface (GUI) comprising at least one user-selectable option corresponding to at least one preferred camera setting of the primary user to apply while the current user is capturing images using the first camera.

\* \* \* \* \*